(12) United States Patent
Klett (10) Patent No.: US 11,825,836 B1
(45) Date of Patent: Nov. 28, 2023

(54) CAPITAL COLLAR

(71) Applicant: John Klett, Santa Barbara, CA (US)

(72) Inventor: John Klett, Santa Barbara, CA (US)

(*) Notice: Subject to any disclaimer, the term of this patent is extended or adjusted under 35 U.S.C. 154(b) by 0 days.

(21) Appl. No.: 18/196,325

(22) Filed: May 11, 2023

Related U.S. Application Data

(60) Provisional application No. 63/410,913, filed on Sep. 28, 2022.

(51) Int. Cl.
*A01M 99/00* (2006.01)
*A22B 3/08* (2006.01)

(52) U.S. Cl.
CPC .............. *A01M 99/00* (2013.01); *A22B 3/08* (2013.01)

(58) Field of Classification Search
CPC ............. A22B 3/08; A22B 3/10; A01M 23/34
See application file for complete search history.

(56) References Cited

U.S. PATENT DOCUMENTS

| 3,024,532 | A | * | 3/1962 | Bettcher | ............... | B26B 25/002 |
| | | | | | | 30/276 |
| 5,317,989 | A | * | 6/1994 | Swanson | ............... | A01K 27/001 |
| | | | | | | 119/793 |
| 5,467,269 | A | | 11/1995 | Flaten | | |
| 5,647,303 | A | * | 7/1997 | Deioma | ............... | A01K 27/001 |
| | | | | | | 119/864 |
| 6,101,980 | A | * | 8/2000 | Davies-Ross | ........ | A01K 27/001 |
| | | | | | | 119/856 |
| 6,747,355 | B2 | | 6/2004 | Quinlan et al. | | |
| 7,006,983 | B1 | | 2/2006 | Packes, Jr. et al. | | |
| 7,415,442 | B1 | | 8/2008 | Battaglini et al. | | |
| 7,801,799 | B1 | | 9/2010 | Brake, Jr. et al. | | |
| 10,786,919 | B2 | * | 9/2020 | Levsen | ................... | A22B 5/165 |
| 11,077,571 | B2 | * | 8/2021 | Esarey | ................... | B26B 25/002 |
| 2004/0153402 | A1 | | 8/2004 | Smith et al. | | |
| 2008/0255942 | A1 | | 10/2008 | Craft | | |
| 2009/0276305 | A1 | | 11/2009 | Clopp | | |
| 2011/0022446 | A1 | | 1/2011 | Carney, II et al. | | |
| 2011/0258062 | A1 | | 10/2011 | Hirson | | |

* cited by examiner

*Primary Examiner* — Tien Q Dinh
*Assistant Examiner* — William L Gmoser
(74) *Attorney, Agent, or Firm* — Sandy Lipkin (57) ABSTRACT

A constricting collar and method of use that provides for a means of humane end of life for a condemned individual or an individual making an end of life decision where it is legal to do so. The collar is openable and closeable to be fixed around a person's neck. The collar has a cushion at the back of the neck and a constricting member at the front. Various means can be employed to trigger the constricting member to move toward the cushion at the back of the neck, such as a screw, a screw gear, a rack and pinion gear, and an inflatable air cartridge. The method of use includes the administration of a tranquilizing agent after placement of the collar around a person's neck after which the constricting action can be activated either through a remote or a button on the collar itself or in the case of the inflatable mechanism, the application of air through a cylinder.

18 Claims, 7 Drawing Sheets

CAPITAL COLLAR

BACKGROUND OF THE INVENTION

Reference to Prior Application

This application claims priority of the provisional patent application 63/410,913, filed Sep. 28, 2022 entitled CAPITAL COLLAR by John Klett.

FIELD OF THE INVENTION

The field of this invention relates generally to the field of devices to aid in the termination of life and more particularly toward a humane collar that cuts off oxygen to the brain after the individual has received a calming medication.

DESCRIPTION OF THE PRIOR ART

Within the field of both state executions and in states where end-of-life self-determined life termination is legal, there exist, theoretically, humane means to end a life. The most widely understood method be the most humane is via lethal injection. However, there is plenty of evidence that the chemicals administered to end the life do indeed cause suffering.

The three-drug cocktail method, which is the most recent protocol used in two dozen states, typically involves the following steps: 1) a barbiturate is administered that acts as a sedative and painkiller, usually in the form of sodium thiopental or phenobarbital; 2) a neuromuscular blocking drug is administered, such as vecuroniurn bromide, which arrests nearly all of the body's muscles; and 3) a lethal dose of potassium chloride is administered to stop the heart.

Simply stated, the first drug in the three-drug cocktail places the subject in an unconsciousness state. The second drug causes paralysis, and the third drug induces a heart attack. The side effects of the three-drug cocktail in the administration of death penalty are horrendous. In some well documented cases, once the second drug has been administered, the condemned have had their lungs fill up with fluids causing them to gasp for breath and to go into convulsions. Some are even kept alive for hours before their hearts had finally stopped.

Because of this, there has been a call for the abolition of the death penalty and is the basis for the "cruel and unusual punishment" arguments. Currently, the Supreme Court has left determination of that matter to the states.

It is the object of the instant invention to provide a device and method of use that is a more humane to end a human life than current methods.

SUMMARY OF THE INVENTION

The basic embodiment of the present invention teaches a constricting collar to cause the termination of breathing in an individual comprising: a top portion that is substantially circular with a center aperture with a radius sufficient to wrap around a neck; a bottom portion that is substantially circular with a center aperture with a radius sufficient to wrap around a neck, said top and bottom portions being flush with one another creating an inner space therebetween; a perimeter around said top and bottom portions; an inner diameter distal from said perimeter; a cushion attached at a point along said inner diameter; a constricting member opposite said cushion on said inner diameter; a motor in said inner space that can be activated to move said constricting member toward said cushion; and an actuator to activate said motor.

The above embodiment can be further modified by defining that a latch is provided along said perimeter to allow said collar to open and close for affixing to a neck.

The above embodiment can be further modified by defining that a screw drive activates said motor.

The above embodiment can be further modified by defining that a rack and pinion drive with stepper motor activates said constricting member.

The above embodiment can be further modified by defining that a battery powers said screw drive.

The above embodiment can be further modified by defining that a battery activates said stepper motor.

The above embodiment can be further modified by defining that said constricting member is inflatable and said inflatable constricting member is activated through an attachable air cartridge.

The above embodiment can be further modified by defining that said motor is activated through the pressing of an attached button attached to said perimeter.

The above embodiment can be further modified by defining that electronics are included inside of said inner space which is activated remotely through a wireless signal.

An alternate embodiment of the instant invention teaches a method of a humane ending of life comprising: acquiring a constricting collar, said constricting collar further comprising: a top portion that is substantially circular with a center aperture with a radius sufficient to wrap around a neck; a bottom portion that is substantially circular with a center aperture with a radius sufficient to wrap around a neck, said top and bottom portions being flush with one another creating an inner space therebetween; a perimeter around said top and bottom portions; an inner diameter distal from said perimeter; a cushion attached at a point along said inner diameter; a constricting member opposite said cushion on said inner diameter; a motor in said inner space that can be activated to move said constricting member toward said cushion; and an actuator to activate said motor; affixing said constricting collar around a neck; administering a tranquilizing agent; and actuating said motor.

The above embodiment can be further modified by defining that a latch is provided along said perimeter to allow said collar to open and close for affixing to a neck.

The above embodiment can be further modified by defining that a screw drive activates said motor.

The above embodiment can be further modified by defining that a rack and pinion drive with stepper motor activates said constricting member.

The above embodiment can be further modified by defining that a battery powers said screw drive.

The above embodiment can be further modified by defining that a battery activates said stepper motor.

The above embodiment can be further modified by defining that said constricting member is inflatable and said inflatable constricting member is activated through an attachable air cartridge.

The above embodiment can be further modified by defining that said motor is activated through the pressing of an attached button attached to said perimeter.

The above embodiment can be further modified by defining that electronics are included inside of said inner space which is activated remotely through a wireless signal.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Turning to the drawings, the preferred embodiment is illustrated and described by reference characters that denote similar elements throughout the several views of the instant invention.

The preferred embodiment of the instant invention provides for a device and method for ending a human life, either through state execution or through end-of-life care. The instant invention utilizes the method of life termination that cuts off oxygen to the brain, but does not involve the trauma involved when using a noose-like apparatus.

The instant invention is a collar that can be fastened around the neck of the person. Electrical, air-cylinder driven or manual mechanical pressure can be applied to the collar such that it tightens around the neck, thereby decreasing the circumference until the person no longer has oxygen traveling to his or her brain.

Electrically, this could be accomplished with circuitry inside of the collar that responds to activation through an external electrical device.

Mechanically, a screwing mechanism could be used such that as the screw is tightened so is the circumference of the collar. As the circumference of the collar is tightened around the person's neck, first the person loses consciousness, after which asphyxiation follows, losing the ability to breathe and eventually death.

No violent trauma is caused like when hung. Furthermore, the fact of initial consciousness removes any struggle associated with trying to breathe.

The device of the instant invention is a humane alternative to the inhumane three-drug cocktail used during state executions and is a superior methodology for all executions. The device of the instant invention is placed around the neck of the condemned and is activated after the administration of a sedative that puts the condemned to sleep. The device of the instant invention then causes immediate asphyxiation. Once the collar is activated, the condemned will lose consciousness within thirty seconds and will slowly fall asleep or pass out, and within four minutes the heart stops beating and death ensues. The collar only requires the administration of the first drug in the three-drug cocktail, i.e., phenobarbital, which is used to sedate the condemned, followed by the activation of the collar which will asphyxiate the condemned, stopping the heart in approximately four minutes and followed by death.

It is important to note that asphyxiation is not a painful experience due to the fact that loss of consciousness is immediate, i.e., within thirty seconds and accordingly, there is no suffering.

Adding agency to the process, a timer can be affixed to the collar thereby allowing the death row prisoner or other end-of-life person choosing to use the device the ability to activate the timer himself or herself before the intravenous administration of the sedative phenobarbital. This procedure can allow the condemned to initiate his or her own death as a show of contrition to the surviving families of the deceased or in the case of terminal illness, taking agency over his or her own end of life.

As alluded to above, the collar can also be used to end the lives of those who suffer from painful terminal illnesses. This end of life methodology can be used to end the lives who are deemed qualified by medical professionals and who seek an alternative to the toxic drug cocktails.

In summary, the instant invention provides for a screw-driven and gear-driven design with electrical motors followed by an air-driven design with different designs to apply the pressure. The collar of the instant invention could also include a version that is a soft hook and loop collar with an air bladder inside Structurally, the collar 10 of the instant invention is generally circular with a top 12 and a bottom 14 and a center aperture 16 which is where the neck of the individual is place. The collar 10 has a perimeter 18 that is breakable with an opening, such as a latch 20 that allows the perimeter 18 to split so that the collar 10 can be affixed around the neck of a person. The inner diameter 22 of the collar 20 is provides for a cushioning portion 24 that seats the collar around the back of the person's neck. Opposite the cushioning back neck pad is constrictor 26. The constrictor 26 is flexible and made of a heavy duty rubber.

Figure 1:
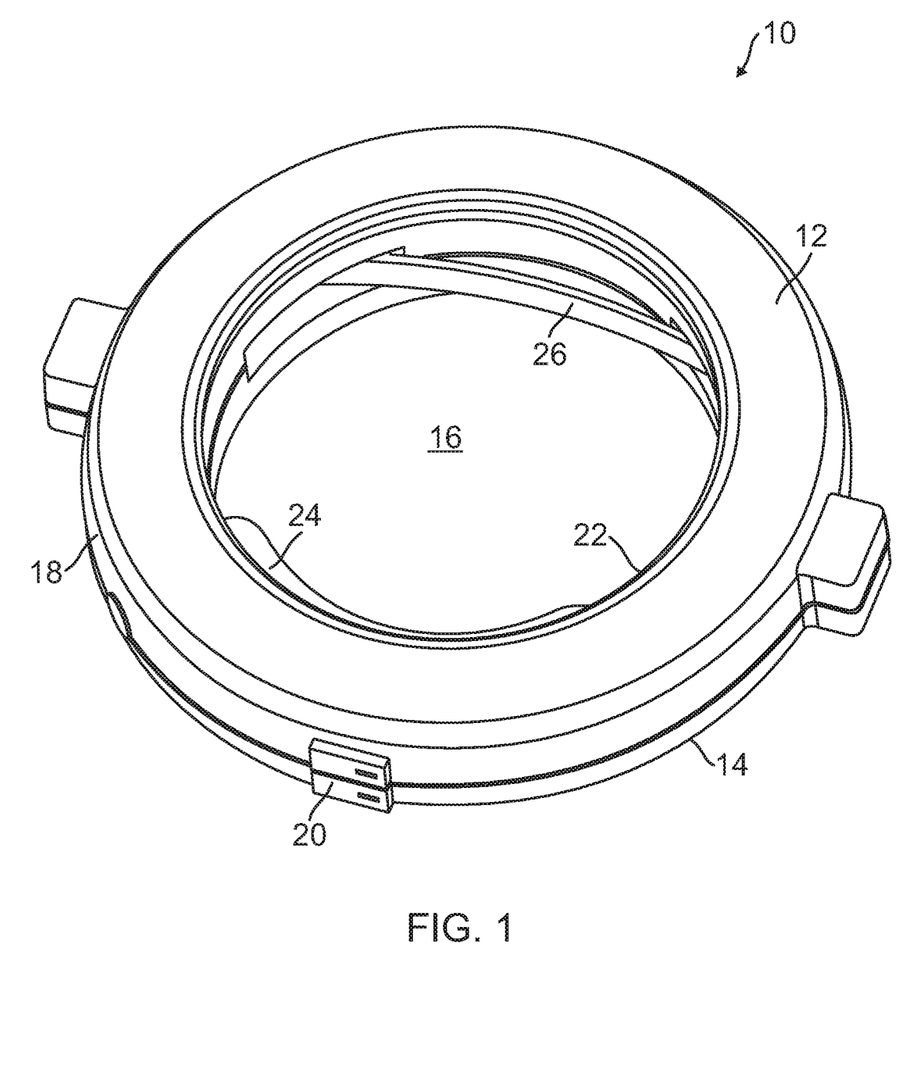
FIG. 1 is a top perspective view of the constricting collar of the instant invention.
Figure 2:
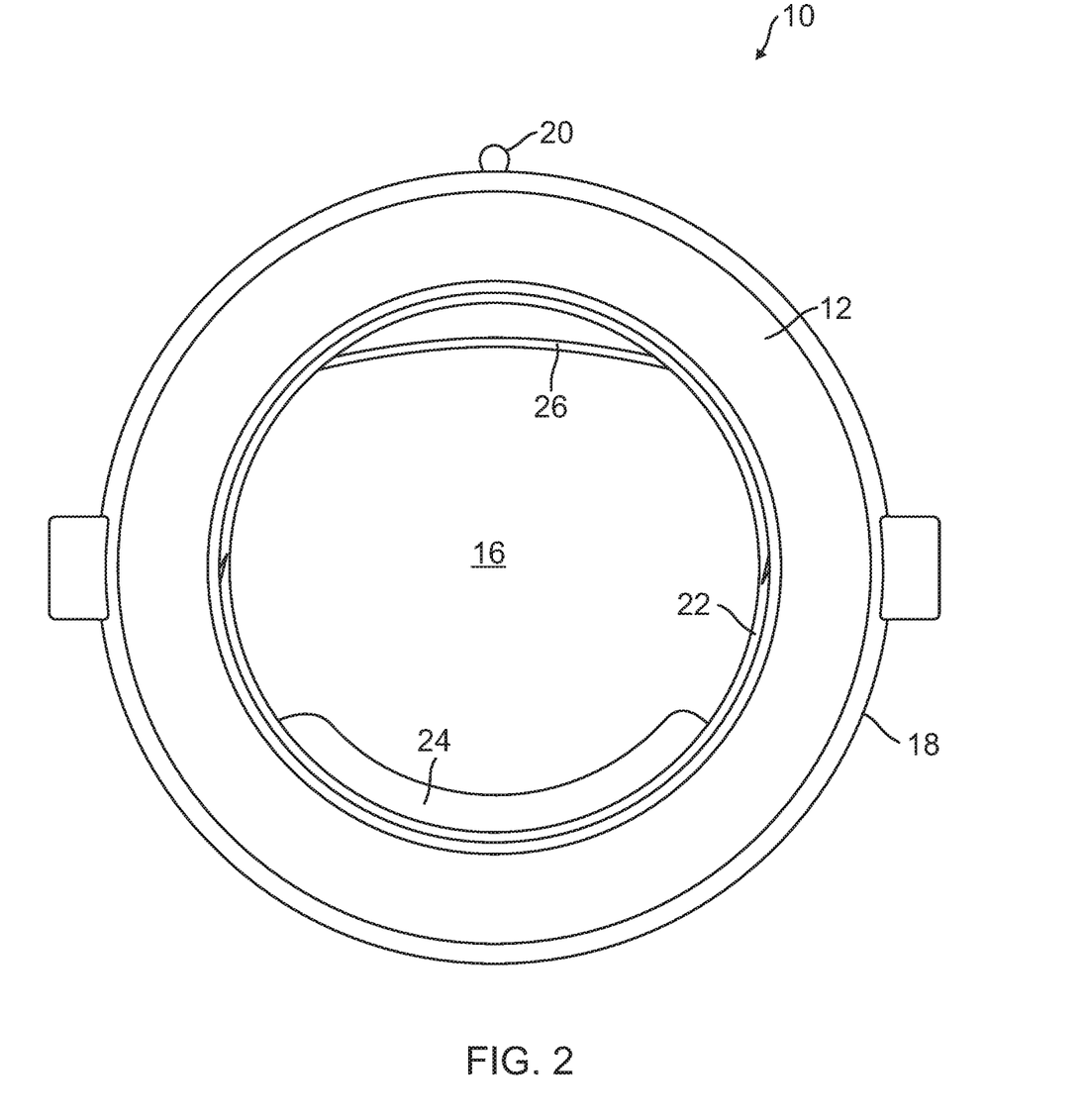
FIG. 2 is a top plan view of the constricting collar of the instant invention.
Figure 3:
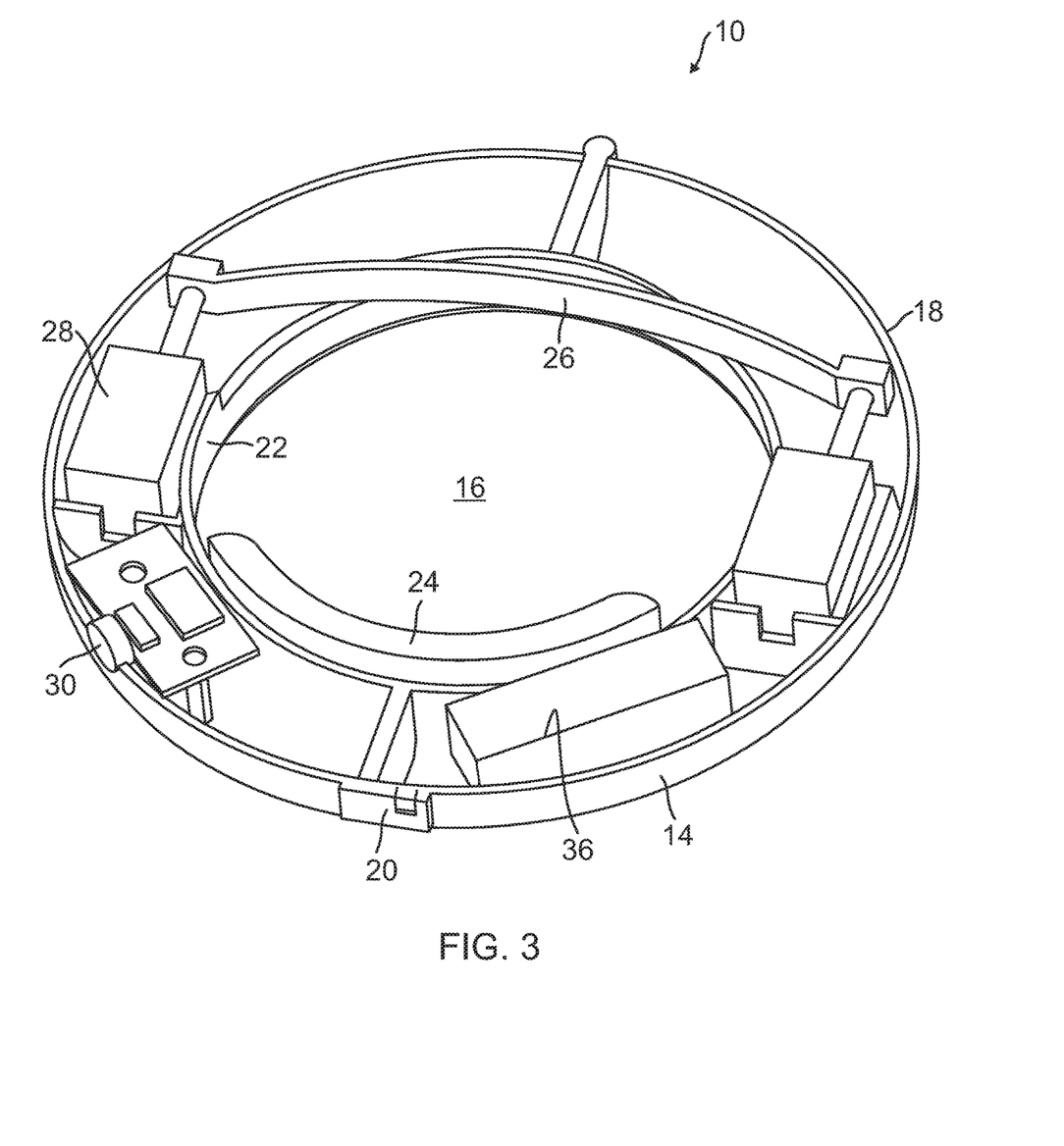
FIG. 3 is a top perspective view of the inside of the constricting collar of the instant invention showing the screw drive mechanism.
Figure 4:
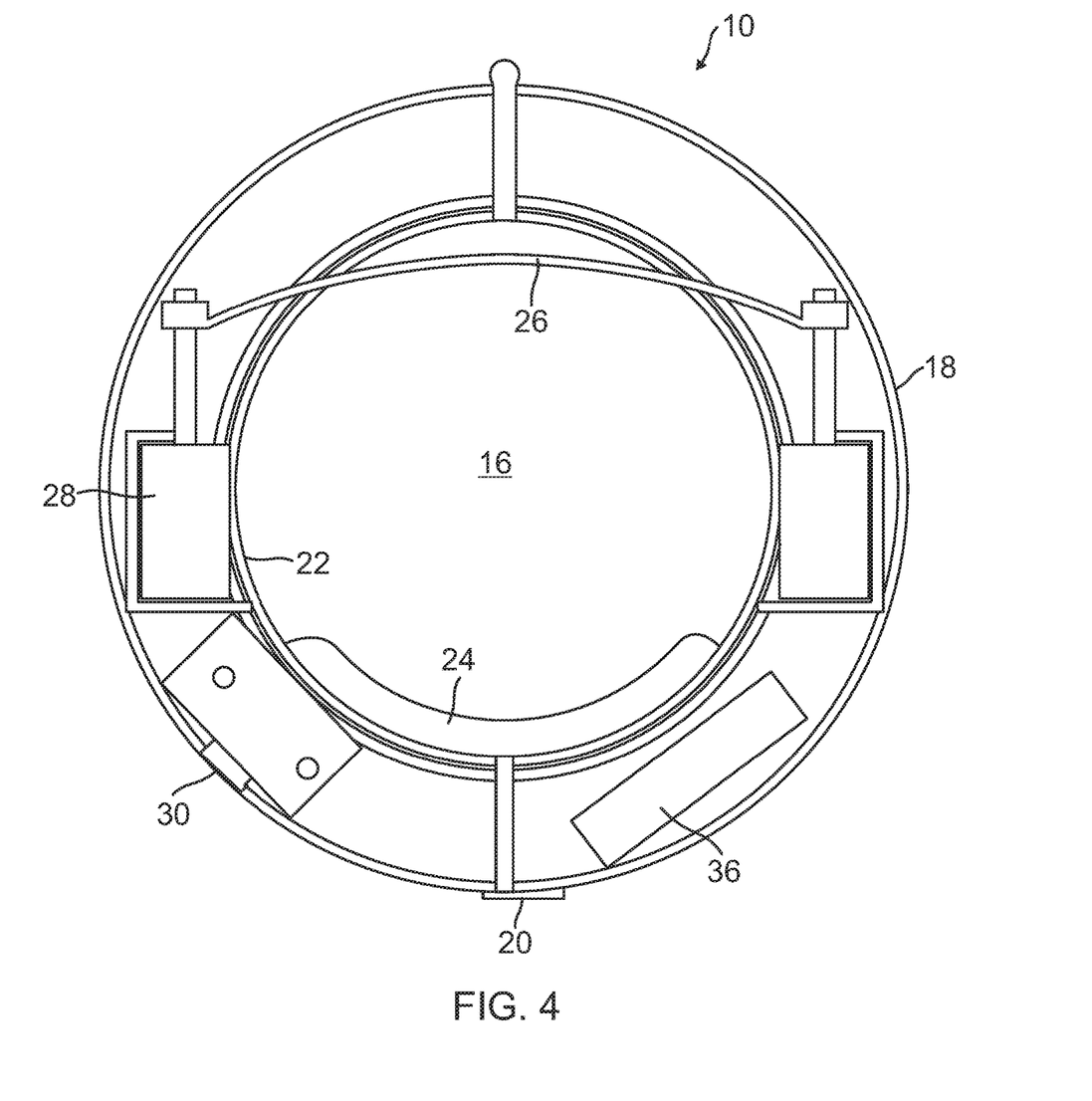
FIG. 4 is a top plan view of the inside of the constricting collar of the instant invention showing the screw drive mechanism.
Figure 5:
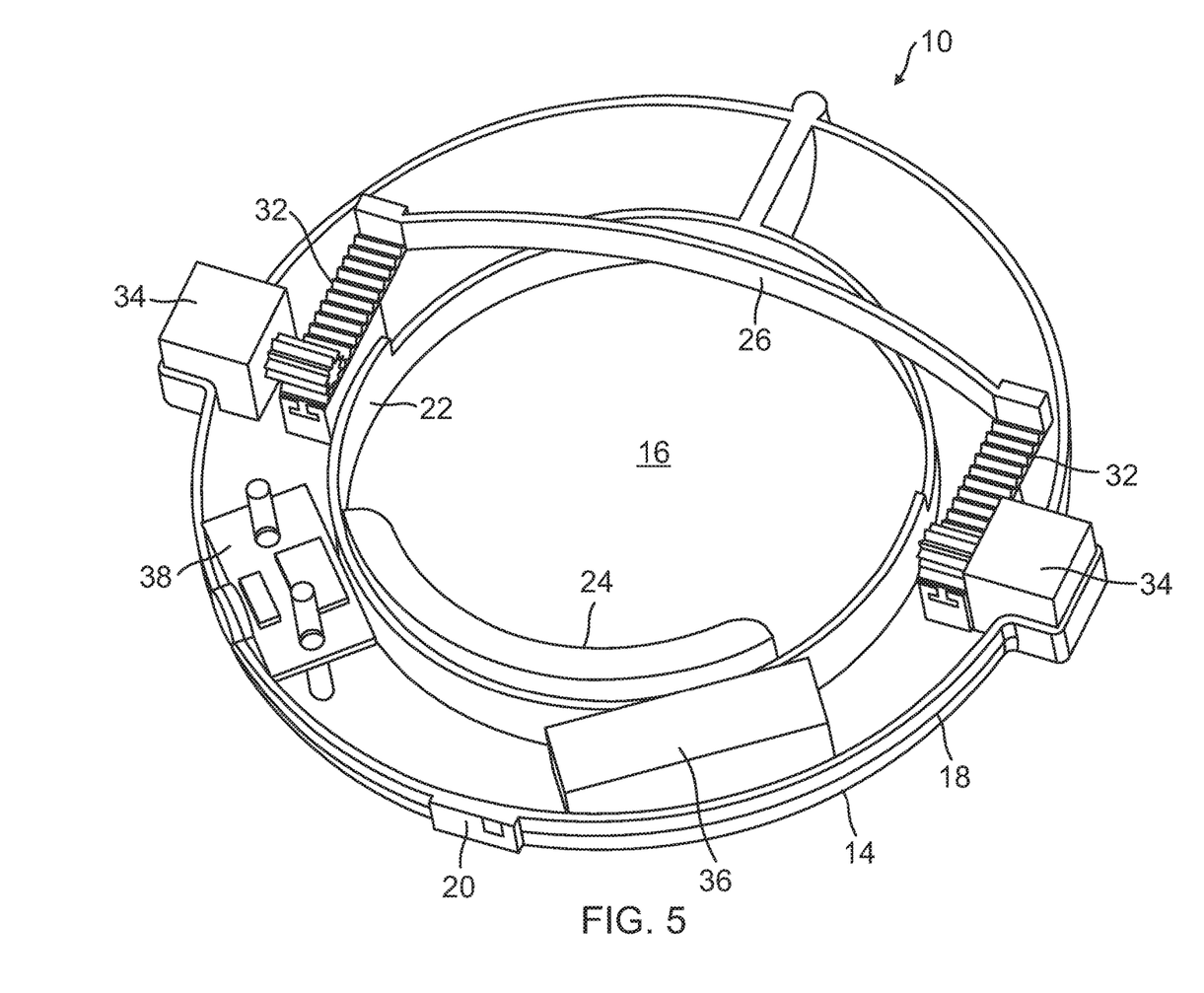
FIG. 5 is a top perspective view of the inside of an alternate embodiment of the constricting collar of the invention that uses a rack and pinion gear.

The constrictor 26 moving toward the back neck cushioning 24 is what leads to the choking that is desired. Once affixed around a person's neck, activation of the constrictor 26 can be done by a variety of ways. As shown in FIGS. 3 and 4, the constrictor 26 is connected to a screw drive 28 wherein once a screw 30 is turned, the screw drive 28 is activated such that it moves the constrictor 26 forward into the aperture 16 and toward the back neck cushion 24.

Figure 6:
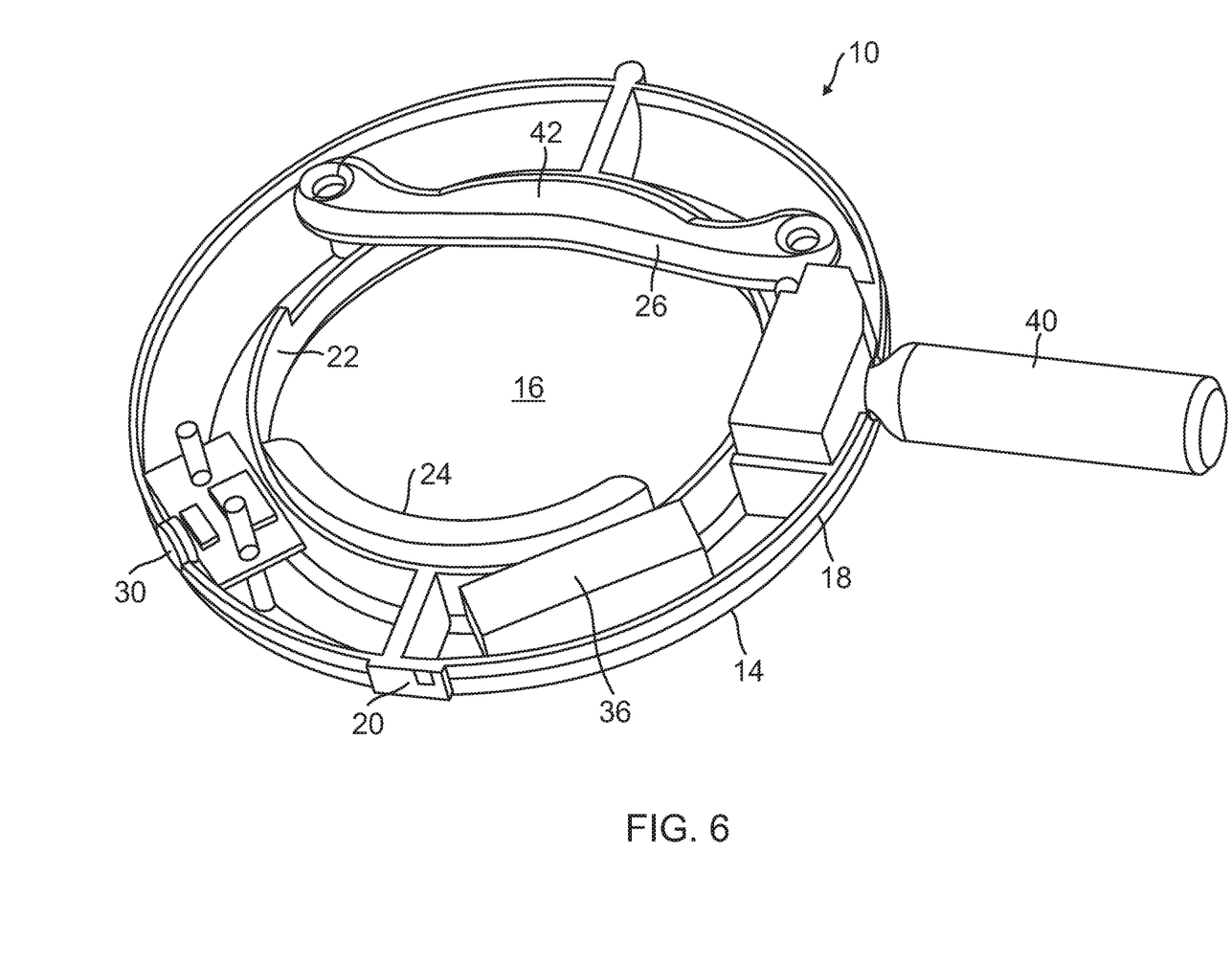
FIG. 6 is a top perspective view of the inside of the constricting collar of the instant invention showing an expandable rubber collar deflated prior to use.

As shown in FIG. 6, one embodiment is a rack and pinion gear driven 32 method of constriction powered by side mounted stepper motors 34 which divide each full rotation into a number equally sized steps for precise load positioning and exceptional holding torque at each of the incremental steps. Stepper motors 34 are electromechanical devices also known as servomechanisms that produce a specific number of revolutions of torque and velocity based on the supplied current and voltage.

Figure 7:
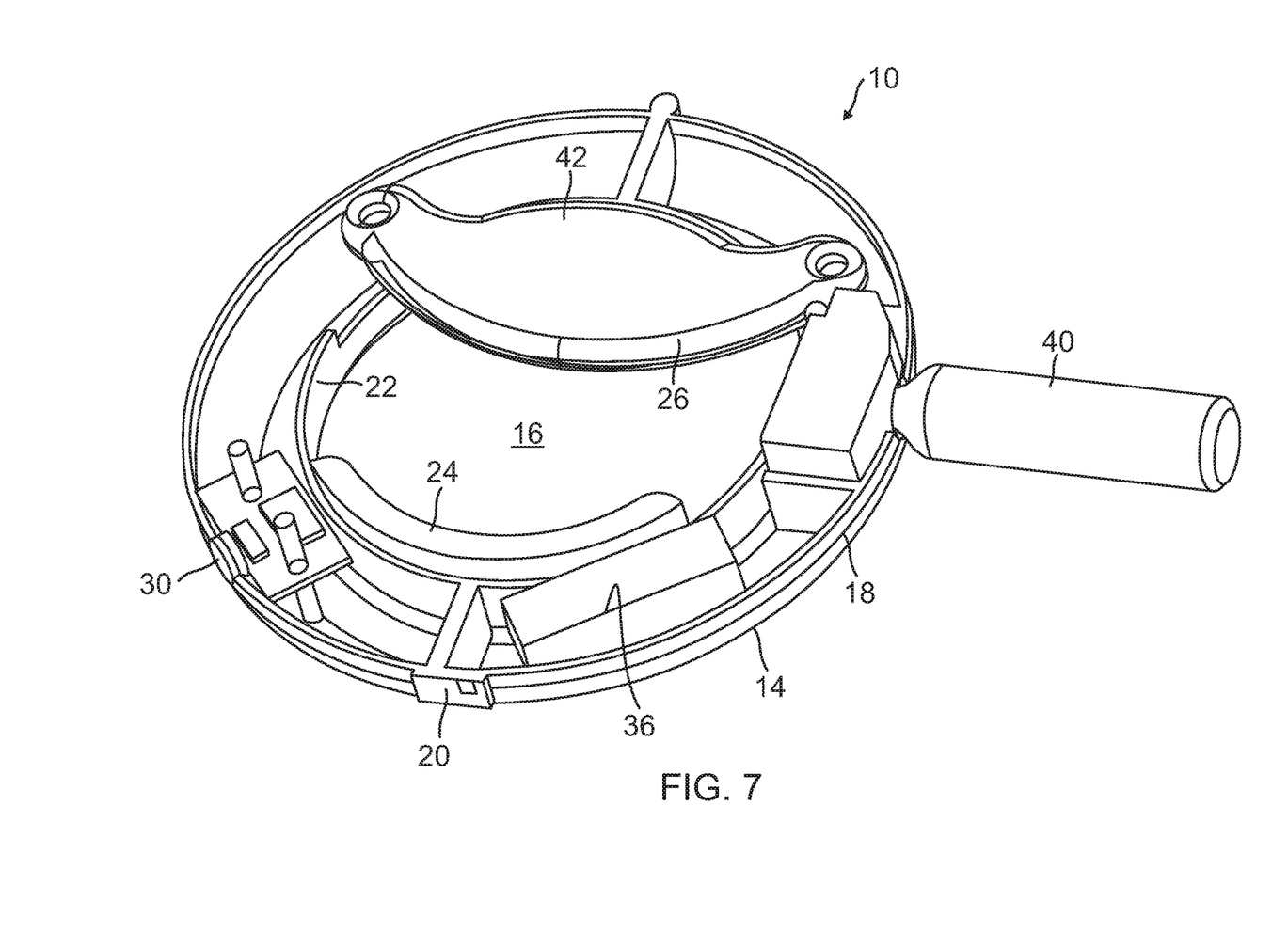
FIG. 7 is the same view as in FIG. 7 but with the expandable rubber inflated in use.

As seen in FIGS. 7 and 8, the air cylinder 40 that is attached and located on the side of the collar 10. The air cylinder 40 depicted provides the inertia for the drive mechanisms which can be screw driven, gear driven or other and are housed in the collar 10. The cylinder 40 is attached to provide the mechanical action required for the physical constriction of the collar by applying pressure on the air passageway.

The method of use for the instant invention is first acquiring the collar 10. Then the collar 10 is opened at the latch 20 such that the bottom 14 and top 12 of the collar are affixed around a person's neck. The collar 10 is affixed such that the cushion 24 is on the back of the person's neck and the constrictor 26 is opposite the cushion 24 at the front of the person's neck. Then the condemned is given phenobarbital or other tranquilizing agent, thereby causing loss of consciousness, after which the collar 10 is activated. Once the condemned is determined to be comatose, the collar is activated. The collar can be activated in various ways depending on the collar design. It is also possible that the condemned, after having the collar 10 affixed and having had the tranquilizing agent administered, can activate the collar himself through the pressing of a button or other remote means, if desired, as an act of final contrition and/or agency in the process.

In the case of the screw gear collar, the screw can be mechanically screwed or a battery can activate the screw, which in turn moves the constrictor 26 closer to the back cushion, cutting off the oxygen supply. In the case of the rack and pinion gear where a battery moves the gear, a button is pushed and the constriction is set in motion. Additionally, compressed air can be added to a constrictor that is expandable such that the constrictor expands and moves toward the back neck cushion thereby cutting off air supply.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A constricting collar to cause the termination of breathing in an individual comprising:
    a top portion that is substantially circular with a center aperture with a radius sufficient to wrap around a neck;
    a bottom portion that is substantially circular with a center aperture with a radius sufficient to wrap around a neck, said top and bottom portions being flush with one another creating an inner space therebetween;
    a perimeter around said top and bottom portions;
    an inner diameter distal from said perimeter;
    a cushion attached at a point along said inner diameter;
    a constricting member opposite said cushion on said inner diameter;
    a motor in said inner space that can be activated to move said constricting member toward said cushion; and
    an actuator to activate said motor.

2. The constricting collar as defined in claim 1 wherein a latch is provided along said perimeter to allow said collar to open and close for affixing to a neck.

3. The constricting collar as defined in claim 1 wherein a screw drive activates said motor.

4. The constricting collar as defined in claim 1 wherein a rack and pinion drive with stepper motor activates said constricting member.

5. The constricting collar as defined in claim 3 wherein a battery powers said screw drive.

6. The constricting collar as defined in claim 4 wherein a battery activates said stepper motor.

7. The constricting collar as defined in claim 1 wherein said constricting member is inflatable and said inflatable constricting member is activated through an attachable air cartridge.

8. The constricting collar as defined in claim 1 wherein said motor is activated through the pressing of an attached button attached to said perimeter.

9. The constriction collar as defined in claim 1 wherein electronics are included inside of said inner space which is activated remotely through a wireless signal.

10. A method of a humane ending of life comprising:
    acquiring a constricting collar, said constricting collar further comprising:
        a top portion that is substantially circular with a center aperture with a radius sufficient to wrap around a neck;
        a bottom portion that is substantially circular with a center aperture with a radius sufficient to wrap around a neck, said top and bottom portions being flush with one another creating an inner space therebetween;
        a perimeter around said top and bottom portions;
        an inner diameter distal from said perimeter;
        a cushion attached at a point along said inner diameter;
        a constricting member opposite said cushion on said inner diameter;
        a motor in said inner space that can be activated to move said constricting member toward said cushion; and
        an actuator to activate said motor;
    affixing said constricting collar around a neck;
    administering a tranquilizing agent; and
    actuating said motor.

11. The method as defined in claim 10 wherein a latch is provided along said perimeter to allow said collar to open and close for affixing to a neck.

12. The method as defined in claim 10 wherein a screw drive activates said motor.

13. The method as defined in claim 10 wherein a rack and pinion drive with stepper motor activates said constricting member.

14. The method as defined in claim 12 wherein a battery powers said screw drive.

15. The method as defined in claim 13 wherein a battery activates said stepper motor.

16. The method as defined in claim 10 wherein said constricting member is inflatable and said inflatable constricting member is activated through an attachable air cartridge.

17. The method as defined in claim 10 wherein said motor is activated through the pressing of an attached button attached to said perimeter.

18. The method as defined in claim 10 wherein electronics are included inside of said inner space which is activated remotely through a wireless signal.

\* \* \* \* \*